June 12, 1951   J. H. F. STEWART   2,557,039
FLUID SEALING DEVICE
Filed Oct. 20, 1945
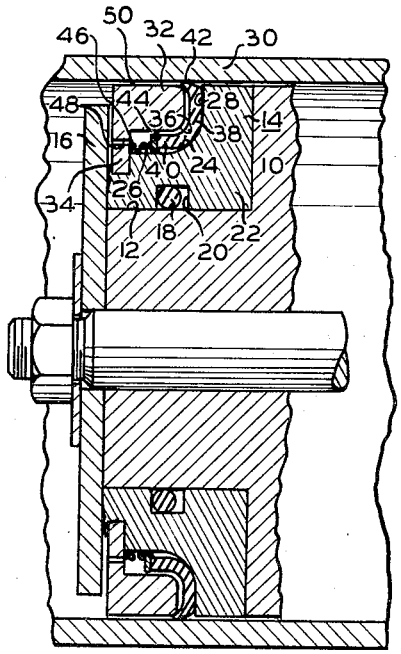
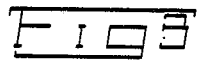
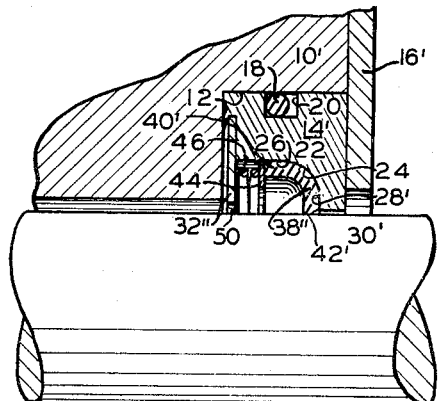
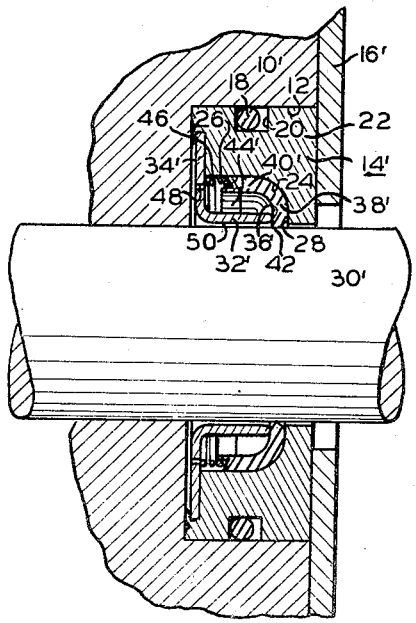
INVENTOR.
JOHN H. F. STEWART
BY
ATTORNEY Patented June 12, 1951

2,557,039

UNITED STATES PATENT OFFICE 2,557,039

FLUID SEALING DEVICE

John H. F. Stewart, Detroit, Mich.

Application October 20, 1945, Serial No. 623,501

3 Claims. (Cl. 309—26)

This invention relates to sealing devices such as are used to form a fluid-tight seal with a cylindrical surface commonly known as oil seals and used, for example, on sliding pistons, piston rods, rotating shafts and the like. In the patent to Stewart, No. 2,332,763, there is disclosed a fluid sealing device in which a tubular sealing sleeve of flexible material is confined between two guide surfaces of generally toroidal form so that the sealing sleeve is projected, first, axially and then along the toroidal surface radially into engagement with the cylindrical surface to be sealed.

It is an object of the present invention to improve the construction of the seal disclosed in the Stewart patent for certain specialized applications and to provide a seal construction having improved efficiency, longer life and lower cost.

In the seal disclosed in the aforesaid patent the sealing sleeve is closely confined between two curved guide surfaces along its entire length. It has been found that, while this construction is eminently suitable for a great many applications, there are other specialized cases in which seals of this construction are not adequate. Thus, in a seal used on a piston sliding in a long, relatively thin-walled cylinder operating at very high pressures, it has been found that the friction of the sealing sleeve on both guide surfaces sometimes interferes with the necessary in-and-out action of the sealing sleeve which is required due to the stretch of the cylinder walls under high pressure. This stretch does not occur uniformly throughout the length of the cylinder due to the additional strength provided by the cylinder head. Consequently, it is necessary in one piston stroke for the seal to move in and out for a substantial distance in order to maintain contact with the cylinder walls, and this action is sometimes prevented by the friction of the sealing sleeve in contact with the guide surfaces of the housing.

According to the present invention, it has been found that a sealing sleeve, which is unsupported by the guide surfaces of the housing except along the outer toroidal surface where the sealing sleeve is deflected from an axial direction to a radial direction, and thus becomes floated in a body of fluid, will greatly facilitate projection and retraction of the sealing lip.

It is also an object of the present invention therefore, to provide a sealing device wherein a tubular sleeve is guided along a toroidal surface by endwise pressure into contact with a cylindrical surface to be sealed and in which the tubular portion of the sleeve is supported upon the fluid being sealed, at least throughout a portion of its length.

Another object is to provide a seal of this character in which inexpensive stamped parts of sheet metal may be utilized in place of parts turned from solid stock.

Further objects and advantages of the present invention will be apparent from the following description, reference being had to the accompanying drawing wherein a preferred form of the present invention is clearly shown.

In the drawing:

Figure 1 is a cross-sectional view of an oil seal particularly adapted for sliding pistons incorporating a preferred form of the present invention.

Figure 2 is a cross-sectional view of an oil seal particularly adapted for sliding or rotating shafts and incorporating another form of the present invention.

Figure 3 is a cross-sectional view of an oil seal particularly adapted for sliding or rotating shafts and incorporating another form of the present invention.

In the construction illustrated in Figure 1, a piston 10 is provided with a counterbore 12 in which an oil seal assembly 14 is retained by a retainer plate 16. A suitable oil seal 18 mounted in a groove 20 seals the counterbore 12 against leakage.

The seal 14 comprises a main housing 22 having a toroidal guide surface 24 with a straight cylindrical portion 26 and terminating at 28 substantially perpendicular to the cylinder wall 30. An abutment member 32 has a flange 34 which is staked to the main housing 22 and is provided with a generally complementary toroidal surface 36 spaced from the guide surface 24. Between the surfaces 24 and 36 there is mounted a flexible sealing ring 38. The ring 38 is thinner than the space between the surfaces 24 and 36 and has a tubular extension 40 which is spaced from the cylindrical portion 26 of the guide surface as well as from the abutment 32. The ring 38 may be provided with a pointed nose at 42 adapted to be wedged between the cylinder wall 30 and the outer corner of the abutment 32. A suitable follower washer 44 and spring 46 serve to project the sealing ring 38 axially into contact with the toroidal portion of guide surface 24 and radially outward into contact with the cylinder wall 30. A series of holes 48 are provided in the flange 34 for the admission of pressure fluid which also projects the sealing ring endwise in addition to the spring.

In operation, with the parts assembled in the position illustrated, and when there is no fluid pressure imposed on the left face of the piston 10, the spring 46 abuts against the left-hand end of the sealing ring 38 with a predetermined pressure which is transmitted endwise through the ring and, due to the curvature of the surface 24, maintains the ring in contact with the wall 30 at the nose 42. This wedges the latter against the corner of the abutment 32 and effectively prevents leakage of oil rightwardly along the clearance space 50.

Upon the application of fluid pressure to the left face of piston 10, this pressure is admitted through the holes 48 and acts upon the face of the follower 44 and upon both the inner and outer side surfaces of the cylindrical portion 40 of sealing ring 38. These latter actions are in a radial direction and, being equal and opposite, produce no net force on the ring 38. The endwise pressure, however, is transmitted from the follower 44 to the end face of the ring 38 and tends to thrust it to the right where it is deflected by the toroidal surface 24 to project the ring 38 radially outward into tighter contact with the cylinder wall 30. When very high pressures are applied, the wall 30 will expand significantly, and the sealing ring 38 will be projected outwardly to follow any movement of the wall 30. As the piston 10 travels the length of the cylinder, the amount of expansion of wall 30 under fluid pressure will vary at different distances from the head end of the cylinder.

Due to the floating of a substantial portion of the length of sealing ring 38 upon a body of fluid and out of contact with the guide surface 24 and abutment 32, the sealing ring 38 has ample freedom of action to move inwardly and outwardly following the contours of the cylinder wall 30.

In Figure 2 there is illustrated a modified form of the present invention particularly adapted for sealing a sliding or rotating shaft. In the construction illustrated, a counterbore 12 is formed in a stationary housing part 10' to receive an oil seal assembly 14' held in place by a retainer plate 16'. The main housing member 22 and other parts identified by the same reference numerals may be identical to those previously described. The abutment 32', however, for lower cost of manufacture is made from a stamped or drawn sheet metal piece of generally tubular form having a flange 34' which is staked to the main housing 22. The right-hand end of the abutment 32' is provided with a rounded nose at 36' to act as an abutment to prevent leftward movement of the sealing lip 42 of the sealing ring 38' when sealing against high pressures.

The sealing ring 38' differs from the previously-described sealing ring in that the cylindrical portion 40' may contact the cylindrical portion 26 of the guide surface 24. The follower abutment 44' may also be of beveled form as is the end surface of sealing ring 38' to wedge the end of the sealing ring outwardly into contact with the surface 26.

The action of the seal is similar to that previously described except that in the present case, where the member to be sealed, such as the shaft 30', does not partake of any substantial radial motion, the friction of the sealing ring along the guide surface of the housing does not interfere with proper sealing action. In addition, contact of the portion 40' of the sealing ring with surface 26 is desirable under conditions where at times the pressure difference across the seal may be reversed; that is, the side which is normally subjected to pressure may at times be subjected to a vacuum. Under these conditions, the beveled follower 44' wedges the back end of the sealing ring into engagement with the surface 26 tightly and prevents entrance of air to the mechanism which otherwise might leak along the surfaces 28, 24 and 26.

In the form of the invention illustrated in Figure 3, there is shown a seal for light-duty service of inexpensive construction wherein the sealing ring is entirely unsupported on its inner side and there is no abutment other than the shaft 30' for the sealing lip of the seal. This seal differs from the construction shown in Figure 2 in that the abutment member comprises merely a flat washer 32'' staked to the housing 22 and providing a clearance 50 with the shaft 30' through which fluid pressure is applied to the entire inner contour of the sealing ring 38''. The latter may have a flat end for the follower 44 and not be adapted for sealing against a vacuum.

The action of this seal will be readily understood from the previous description, it being apparent that this construction is well suited for light-duty applications wherein high pressures or vacuums are not applied to the seal.

While the form of embodiment of the invention as herein disclosed constitutes a preferred form, it is to be understood that other forms might be adopted, all coming within the scope of the claims which follow.

What is claimed is as follows:

1. In a device for forming a fluid seal with a cylindrical surface, the combination of a housing member having a guide surface spaced from the cylindrical surface and including a toroidal portion terminating adjacent and substantially perpendicular to the sealing surface, a flexible sealing ring having a complemental toroidal surface in contact with said toroidal portion and having a cylindrical extension beyond the toroidal surface and spaced from the cylindrical surface, means for forcing the sealing ring axially toward the toroidal portion of the guide surface, said cylindrical extension being free from mechanical support radially along at least the full length of the concave toroidal surface and extension and subject in a radial direction to only fluid pressure forces, and means forming an abutment for the end of the sealing ring adjacent the cylindrical surface and on the opposite side thereof from the toroidal guide surface.

2. In a device for forming a fluid seal with a cylindrical surface, the combination of a housing member having a guide surface spaced from the cylindrical surface and including a toroidal portion terminating adjacent and substantially perpendicular to the sealing surface, a flexible sealing ring having a complemental toroidal surface in contact with said toroidal portion and having a cylindrical extension beyond the toroidal surface and spaced from the cylindrical surface, means for forcing the sealing ring axially toward the toroidal portion of the guide surface, said cylindrical extension being free from mechanical support radially along at least the full length of the concave toroidal surface and extension and subject in a radial direction to only fluid pressure forces, and a sheet metal member comprising a tubular portion adjacent the cylindrical surface and a perpendicular flange portion secured to the housing for providing an abutment for the end of the sealing ring adjacent the cylindrical surface and on the opposite side thereof from the toroidal guide surface.

3. In a device for forming a fluid seal with a cylindrical surface, the combination of a housing member having a guide surface spaced from the cylindrical surface and including a toroidal portion terminating adjacent and substantially perpendicular to the sealing surface, a flexible sealing ring having a complemental toroidal surface in contact with said toroidal portion and having a cylindrical extension beyond the toroidal surface and spaced from the cylindrical surface, means for forcing the sealing ring axially toward the toroidal portion of the guide surface, said cylindrical extension being free from mechanical support radially along at least the full length of the concave toroidal surface and extension and subject in a radial direction to only fluid pressure forces, and a complemental abutment member associated with the housing having a surface generally parallel to and spaced from the guide surface providing an abutment for the end of the sealing ring adjacent the cylindrical surface and on the opposite side thereof from the toroidal guide surface of the housing, said abutment member being spaced from the cylindrical extension of the sealing ring.

JOHN H. F. STEWART.

REFERENCES CITED

The following references are of record in the file of this patent:

UNITED STATES PATENTS

| Number | Name | Date |
|---|---|---|
| 1,682,222 | Greenidge | Aug. 28, 1928 |
| 2,332,763 | Stewart | Oct. 26, 1943 |
| 2,401,379 | Smith | June 4, 1946 |
| 2,404,664 | Skinner | July 23, 1946 |

FOREIGN PATENTS

| Number | Country | Date |
|---|---|---|
| 168,517 | Switzerland | of 1934 |